Sept. 24, 1935.	A. J. GRANBERG	2,015,267
THERMOSTATIC CONTROL FOR FLUID METERS
Filed Aug. 2, 1933
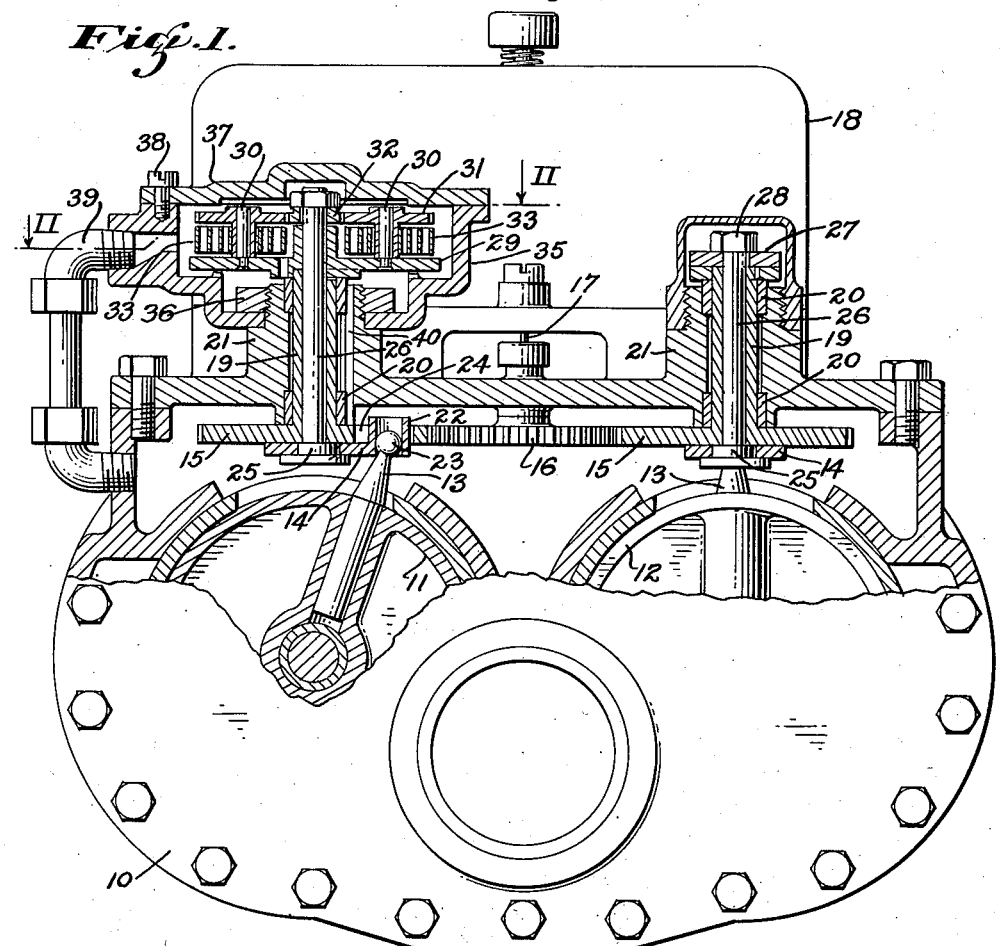
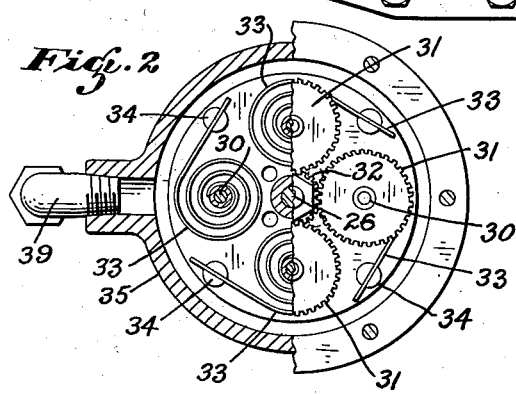
INVENTOR.
Albert J. Granberg
BY Townsend & Loftus
ATTORNEYS.

Patented Sept. 24, 1935

2,015,267

UNITED STATES PATENT OFFICE 2,015,267

THERMOSTATIC CONTROL FOR FLUID METERS

Albert J. Granberg, Berkeley, Calif., assignor to Ralph N. Brodie Company, Oakland, Calif., a corporation of California Application August 2, 1933, Serial No. 683,315

5 Claims. (Cl. 73—30)

The present invention relates to fluid meters and more particularly to improvements in the type of fluid meter disclosed in my prior Patent #1,811,789, for "Fluid meter", issued June 23, 1931.

The meter disclosed in said patent is one in which a pair of cylinders are arranged parallel to one another. Each cylinder contains a reciprocable piston and is provided with inlet and outlet ports arranged to be opened and closed by reciprocation of the pistons in such a manner that fluid under pressure will cause the pistons to reciprocate in the cylinders. The displacement of the pistons being known, the volume of fluid passing through the cylinders is registered by suitable mechanism operated by the reciprocal motion of the pistons.

This type of meter operates accurately when the temperature of the medium being metered remains constant. However, when weather conditions and other causes vary the temperature of the fluid, its specific gravity is altered and inaccuracy in metering ensues.

It is, therefore, the object of the present invention to provide an improved meter which comprises means that will act automatically upon variations in temperature of the fluid being metered to compensate for such variations and that will effect such compensation by simple and accurately operating mechanical means.

One form which the invention may assume is exemplified in the accompanying drawing, to which reference is made in the following specification. In the specification further objects and advantages of the invention are made apparent.

In the drawing—

Fig. 1 is an end elevation, partly in section, of a fluid meter embodying my invention; and Fig. 2 is a sectional view taken on the line II—II of Fig. 1.

Referring more particularly to the drawing, I show a meter housing at 10. The meter housing contains a pair of parallel cylinders within which are mounted for reciprocal and oscillatory movement pistons 11 and 12. Each piston carries a loosely mounted crank pin 13, which crank pins are connected with cranks 14 carried by gears 15. Reciprocation of the pistons, which is caused by fluid passing through the meter, imparts rotation to the gears 15, through the cranks 14 and the crank pins 13. Both of the gears 15 mesh with a central gear 16 fixed to a shaft 17, which shaft extends upwardly into a casing 18 fixed to the top of the meter casing and containing a counting mechanism of conventional design which is operated to count and totalize the number of gallons or other volumetric units passing through the meter.

Inasmuch as the counting mechanism is of a well known conventional type and forms no part of the present invention, and inasmuch as the meter so far described is practically identical to the one disclosed in my co-pending application referred to above, further detailed description of these parts will be unnecessary.

The present invention is particularly concerned with means for varying the stroke of the piston 11 and for causing such variation to take place automatically in the event of changes in temperature of the fluid being metered.

Referring to Fig. 1 of the drawing, the gears 15 are shown as provided with integral hollow shafts 19 mounted for rotation in bearings 20 fitted in the upper and lower ends of hollow bosses 21 formed in the top plate of the meter casing. The cranks 14 are provided at their outer ends with sockets 22 for the reception of ball-shaped ends 23 on the crank pins 13. The sockets 22 are received by radial slots 24 formed in the gears 15 so that the cranks 14 are free to be moved radially of the gears 15 to vary the stroke and thereby vary the displacement of the pistons. Each of the cranks 14 is mounted on an eccentric 25 formed at the lower end of a pin 26 which extends upwardly through the hollow shaft 19. Referring to the piston shown on the right-hand side of Fig. 1, the upper end of the pin 26 is fitted with a disc 27 keyed to the pin for rotation therewith. Rotation of the pin 26 by means of the disc 27 rotates the eccentric 25 and therefore varies the effective length of the crank pin 14. A nut 28 is provided at the end of the pin 26 to lock the eccentric in its proper adjusted position.

Referring now to the mechanism associated with the piston 11 at the left-hand side of Fig. 1, the upper end of the hollow shaft 19 carries a circular plate 29, which is fixed to such shaft for rotation therewith. The plate 29 supports spaced bearing pins 30, each of which carries a gear 31 for rotation thereon. The gears 31 are shown as four in number, but it will appear, as the description proceeds, that more or less may be used as desired. Each of these gears is in mesh with a central gear 32 fixed to the pin 26. A helical bi-metallic element 33 is provided for each of the gears 31 and is arranged with its inner end fixed to the hub of the gear and its outer end fixed to a post 34 carried by the plate 29, there being one post 34 for each of the helical elements. Upon variation in temperature of the bi-metallic elements, they tend to expand and contract, and due to the fact that one of their ends is fixed to the hubs of the gears 31, this expansion and contraction imparts rotary movement to these gears which, being in mesh with the central gear 32, causes rotation of the shaft 26 and movement of the eccentric 25 with the result that the effective length of the crank 14 is varied.

In order that the bi-metallic elements will be maintained at the same temperature as that of the fluid being metered, they are kept immersed in the fluid that is passing through the meter. A fluid tight casing 35 is fixed to the upper end of the boss 21 by means of a nut 36. A coverplate 37 is provided for the casing and secured thereto by means of screws such as shown at 38. A conduit 39 forms communication between the interior of the casing 35 and the interior of the meter casing 10, and a passage 40 extending through the boss 21 alongside of the shaft 19 also forms means of fluid communication between the two casings.

It should be understood that when the meter is in operation the circular plate 29, which carries the gears 31 and the bi-metallic elements, is rotating and therefore a centrifugal motion is set up in the fluid within the casing 35. This centrifugal motion causes the fluid to flow outwardly through the conduit 39, through which it is returned to the meter casing, and this outward flow creates a suction within the casing 35 so that liquid is drawn up through the passage 40; consequently the interior of the casing 35 is always filled with, and the bi-metallic elements are always immersed in, fluid which is being circulated through the meter casing and which is, therefore, of the same temperature as the fluid that is being metered.

In operation the meter is first adjusted to operate accurately at a given temperature. When, during the operation of the meter, the temperature of the fluid being metered changes, that portion of the fluid which is being circulated through the passage 40, casing 35 and conduit 39, affects the bi-metallic elements 33 to cause them to expand or contract. Expansion or contraction of the bi-metallic elements rotates the gears 31 and this rotating movement of the gears 31 is imparted through the gear 32 and pin 26 to vary the position of the eccentric 25 and thereby vary the effective length of the crank 14 whereby the stroke of the meter piston 11 is altered to compensate for the variation in volume of the fluid which has been caused by the change in temperature.

The tension of the bi-metallic elements 33 is preferably so adjusted that two of them are tighter than the other two; therefore preventing any lost motion which might otherwise occur between the gears 31 and the central gear 32.

The meter may be adapted to use with different grades of fluid; for example, the American Petroleum Institute classifies various oils according to their specific gravity and coefficients of expansion into five groups, gasoline being included in Group No. 3. It is obvious, therefore, that if the meter is to be used for gasoline, one grade of bi-metallic element will be used; while if the meter is designed for use with oils in Group No. 2, or Group No. 4, temperature variations may be accurately compensated for by merely substituting bi-metallic elements of a different length or having different coefficients of expansion.

While I have shown a preferred form of my invention and described the same in more or less detail, it should be understood that various changes may be resorted to in the construction and arrangement of the several parts within the scope of the appended claims.

Having thus described my invention, what I claim and desire to secure by Letters Patent is:

1. In a fluid meter comprising a metering chamber and a reciprocable piston in said chamber, a casing adjacent said chamber, means forming fluid communication between said casing and said chamber whereby said casing will contain fluid of the same temperature as the fluid in the chamber, a thermostatic element in said chamber, means connecting said thermostatic element with said piston whereby the stroke of the piston will be varied upon variations in temperature of the fluid, and means for imparting revolving movement to said element in said chamber to cause circulation of the fluid through the chamber.

2. In a fluid meter of the reciprocating piston type having a crank pin on a piston connected with a crank to impart rotary movement to a counting device, means for varying the effective length of said crank pin to compensate for changes in temperature of the fluid being metered, said means comprising a rotatable pin having an eccentric portion mounting said crank, a gear on said pin, a second gear in mesh with said first gear, and a thermosensitive element connected with said second gear and immersed in the fluid being metered to rotate the second gear and alter the position of said eccentric upon variations in temperature of the fluid.

3. In a fluid meter comprising reciprocating and oscillating pistons, radially projecting crank pins on said pistons, cranks connected with said pins, whereby reciprocation of the pistons will be accompanied by oscillation thereof to operate the valve means of the meter, said cranks being connected with a counting mechanism to count the reciprocations of said pistons, the combination with a pin having an eccentric portion journaled in one of said cranks and normally rotatable therewith, a plate surrounding said pin, a plurality of thermostatic elements carried by said plate, a gear connected to each of said elements to be rotated by expansion and contraction thereof, and a gear on said pin in mesh with said first named gears whereby expansion and contraction of said elements will rotate said pin and eccentric portion relative to the crank and vary the effective length of the crank to change the displacement of one of the pistons.

4. In a fluid meter comprising reciprocating and oscillating pistons, radially projecting crank pins on said pistons, cranks connected with said pins, whereby reciprocation of the pistons will be accompanied by oscillation thereof to operate the valve means of the meter, said cranks being connected with a counting mechanism to count the reciprocations of said pistons, the combination with a pin having an eccentric portion journaled in one of said cranks and normally rotatable therewith, a plate surrounding said pin, a plurality of gears rotatably mounted on said plate, a helical thermoresponsive element for each of said gears and fixed at one end to a said gear and at the other end to the plate, a gear on said pin in mesh with all of said gears whereby expansion and contraction of said thermoresponsive elements will rotate said pin relative to said crank, and means for circulating a portion of the fluid being metered about said thermoresponsive elements.

5. In a fluid meter comprising reciprocating and oscillating pistons, radially projecting crank pins on said pistons, cranks connected with said pins, whereby reciprocation of the pistons will be accompanied by oscillation thereof to operate the valve means of the meter, said cranks being connected with a counting mechanism to count the reciprocations of said pistons, the combination with a pin having an eccentric portion journaled in one of said cranks and normally rotatable therewith, a plate surrounding said pin, a plurality of gears rotatably mounted on said plate, a helical thermoresponsive element for each of said gears and fixed at one end to a said gear and at the other end to the plate, a gear on said pin in mesh with all of said gears whereby expansion and contraction of said thermoresponsive elements will rotate said pin relative to said crank, and means for circulating a portion of the fluid being metered about said thermoresponsive elements, some of said thermoresponsive elements being under greater tension than others to take up lost motion between the gear on said pin and the other gears.

ALBERT J. GRANBERG.